US006925063B2

(12) United States Patent
Goldshtein et al.

(10) Patent No.: US 6,925,063 B2
(45) Date of Patent: Aug. 2, 2005

(54) VOICE OVER INTERNET COMMUNICATIONS ALGORITHM AND RELATED METHOD FOR OPTIMIZING AND REDUCING LATENCY DELAYS

(76) Inventors: Shmuel Goldshtein, 3 Am V'Olamo Street, Jeruslalem (IL); Kostyantyn S. Synyavsky, 16 Sadovaya Street, Odessa (UA), 65000

( * ) Notice: Subject to any disclaimer, the term of this patent is extended or adjusted under 35 U.S.C. 154(b) by 862 days.

(21) Appl. No.: 09/896,989

(22) Filed: Jul. 2, 2001

(65) Prior Publication Data

US 2002/0110089 A1 Aug. 15, 2002

Related U.S. Application Data

(60) Provisional application No. 60/255,582, filed on Dec. 14, 2000.

(51) Int. Cl.[7] .......................... G01R 31/08; G06F 11/00; H04J 1/16; H04J 3/14; H04L 1/00
(52) U.S. Cl. ........................................ 370/252; 370/229
(58) Field of Search .............................. 370/252, 241, 370/242, 248, 229, 230, 230.1, 352–354, 232, 235, 236, 237, 395.5, 255, 253, 349, 389, 392, 395.52, 471, 903

(56) References Cited

U.S. PATENT DOCUMENTS

| | | | | |
|---|---|---|---|---|
| 6,259,695 B1 * | 7/2001 | Ofek | .......................... | 370/389 |
| 6,452,915 B1 * | 9/2002 | Jorgensen | .................... | 370/338 |
| 6,542,504 B1 * | 4/2003 | Mahler et al. | ............... | 370/392 |
| 6,590,885 B1 * | 7/2003 | Jorgensen | .................... | 370/338 |
| 6,594,246 B1 * | 7/2003 | Jorgensen | .................... | 370/338 |
| 6,614,781 B1 * | 9/2003 | Elliott et al. | ................. | 370/352 |
| 6,628,629 B1 * | 9/2003 | Jorgensen | .................... | 370/322 |
| 6,640,248 B1 * | 10/2003 | Jorgensen | .................... | 709/226 |
| 6,680,922 B1 * | 1/2004 | Jorgensen | .................... | 370/328 |
| 6,728,270 B1 * | 4/2004 | Meggers et al. | ............ | 370/514 |
| 2002/0099854 A1 * | 7/2002 | Jorgensen | .................... | 709/249 |

* cited by examiner

*Primary Examiner*—Wellington Chin
*Assistant Examiner*—Jamal A. Fox
(74) *Attorney, Agent, or Firm*—Meyer, Unkovic & Scott LLP

(57) ABSTRACT

A method of optimizing latency delays in VoIP and other multimedia communications using IPv6 over the "publics" internet and between two end users that involves selecting an optimum VoIP route based upon periodic trace measurements of the best available VoIP routes at the time of VoIP communications and comparison of that information with historic route information between the same two end user destinations. The method of the present invention employs a dynamic data library which is a modification and addition to the Source Routing header within the NEXT header extension of IPv6 and which works in correlation with the Hop-to-Hop Options header of the NEXT header extension within IPv6. This dynamic data library contains a routing database with contains current best available VoIP route information at the time of the VoIP communication and a destination database which contains historical information concerning best available VoIP routes between particular end user destinations.

28 Claims, 2 Drawing Sheets

VOICE OVER INTERNET COMMUNICATIONS ALGORITHM AND RELATED METHOD FOR OPTIMIZING AND REDUCING LATENCY DELAYS

CROSS REFERENCE TO RELATED APPLICATION

This application claims the benefit of U.S. Provisional Application No. 60/255,582, filed Dec. 14, 2000, the contents of which are incorporated herein by reference in their entirety.

FIELD OF THE INVENTION

The present invention relates to a communications algorithm and related method for optimizing and reducing latency delays in voice over Internet Protocol transmissions.

BACKGROUND AND SUMMARY OF THE INVENTION

Internet Protocol ("IP"), or Voice over IP ("VoIP") enables the transmission of voice calls and other multimedia over data networks such as the Internet or corporate enterprise networks. Local IP Telephony gateways act as interfaces between local telephone and data networks to pick-up and hand-off calls. At the gateways, signals are compressed and decompressed, packetized and reassembled. Unfortunately, with this emerging technology, significant problems remain in connection with data packet loss and latency delays during the transmission of data packets. When these data packets embody voice calls, packet loss and latency delays can destroy voice recognition and the quality of the desired communication. Such latency delays arise, in part, from the different modes of data transmission, e.g., fiber optics, hard wiring, satellite communications, cellular transmissions, etc., and the related band width restrictions associated with such transmissions.

Dedicated communications lines and networks (such as a fiber optic cable), with controlled and select data transmission, can obviate latency delays. However, the cost of constructing such a network between individual gateways can be prohibitive.

Thus, a need exists for a VoIP communications algorithm and related method which optimizes latency delays in the generally available IP network or in the "public" Internet. As set forth more fully below, a solution to latency delays during VoIP communications can be obtained through use of IP version 6 ("IPv6") and the introduction of a new header in IPv6 for latency or delay which interacts with a dynamic library to continually test and select the best route of transmission through the IP network and the "public" Internet. This novel VoIP communications algorithm and related method is scalable and affords opportunities for reduced telephony fees and unlimited call potential with reduced latency and improved quality of sound.

Other objects and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

DETAILED DESCRIPTION OF THE PREFERRED EMBODIMENTS

Figure 1:
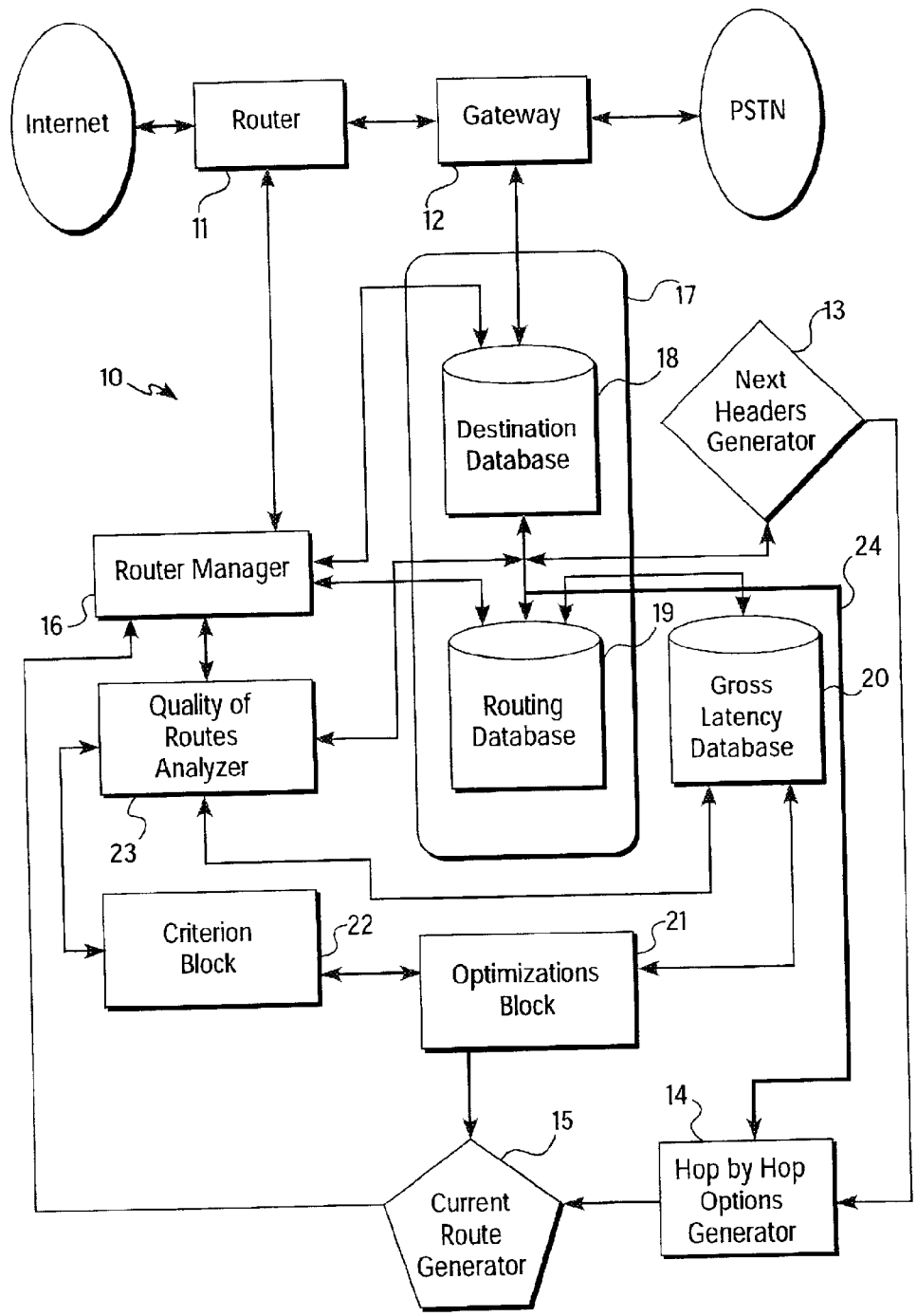
FIG. 1 is a block diagram of the VoIP communications algorithm and related method of the present invention.

The present invention provides a VoIP communications algorithm and related method which minimizes latency delays associated with data packet transmission. In particular, the present invention employs IPv6 in conjunction with latency or delay header and a dynamic library which continually tests and selects the best transmission route through the "public" Internet. This novel VoIP communications algorithm and related method is scalable and affords opportunities for reduced telephony fees and unlimited call potential with reduced latency and improved quality of sound. Other multimedia applications are also possible.

The Internet Protocol or IP has its roots in early research networks of the 1970s, but within the past decade has become the leading network layer protocol. This means that IP is a primary vehicle for a vast array of client server and peer to peer communications, and the current scale of deployment is straining many aspects of its twenty-year old design. Further, efforts to successfully implement VoIP technology has encountered problems arising from data packet loss and latency delays associated with transmission of voice signals, as data packets, through the network. In particular, variable delays in transmission can destroy the recognition of speech. Many of these problems arise from limitations inherent in the current IP version in use—IP version 4.

The present invention implements the benefits which are provided through IPv6. More specifically, IPv6 has been designed to enable high performance, scalable internetworks that should operate as needed for decades. IPv6 offers a number of enhanced features, such as a larger address space and improved packet formats. IPv6 also regularizes and enhances the basic header layout of the IP packet. In this new header format, concepts of main and additional, optional headers are introduced. The main header format in IPv6 is as follows:

| Version = 6 | 8 bits | 20 bits |
|---|---|---|
| | Traffic Class | Flow Label |
| 16 bits | 8 bits | 8 bits |
| Payload Length | Next Header | Hop Limit |
| | 128 bits | |
| | Source Address | |
| | 128 bits | |
| | Destination Address | |

In this header format, the protocol type field of IPv4 (e.g., the TCP or User Datagram Protocol (UDP)) has been replaced by the "Next Header" field. Each header field indicates the type of the next header, which can be a TCP/UDP header, or another IPv6 header. Extension headers for IPv6, in the suggested order, are as follows:

(Primary IPv6 NEXT header)
Hop-by-Hop Options header
Destination Options header-1
Source Routing header
Fragmentation header
Authentication header
IPv6 Encryption header
Destination Options header-2

These extension headers are followed by upper layer headers and payload. Each extension header typically occurs only once within a given packets, with the exception of the destinations option header.

In the present invention, an additional header for Latency or Delay is added to these extensions of the NEXT header format. In particular, the present invention involves a modification of the Source Routing header within the NEXT header extension format.

As detailed below, this additional Latency header, as a modification of the Source Routing header, works in correlation with the existing extension headers within IPv6 to measure and analyze the latency or delay on all available routes through the "public" Internet and select the optimal route at a given period of time and for a given destination.

More specifically, within IPv6 (as in IPv4) a signal/feedback or trace program exists which allows an IPv6 to test route options for a data packet transmission. The VoIP communications algorithm and related method of the present invention augments this trace program and the Hop by Hop Options header of IPv6 to optimize route transmission and reduce latency on a consistent and regularized basis. In operation, the VoIP communications algorithm of the present invention includes a dynamic data library, otherwise known as "DLL," which contains both a destination database and a routing database, which optimizes route transmission in correlation with the Hop-by-Hop Options header. When activated by a new data packet transmission, IPv6 will initially run its trace program to test for the best transmission route. The VoIP communications algorithm of the present invention adds a gross latency database, an optimizations block, a criterion block and a quality of routes analyzer which, in conjunction with the dynamic data library or DLL and IPv6, constantly retest for the best transmission route based on both current and past network conditions for a given destination at a given route.

Referring to FIG. 1, block diagram 10 depicts the manner in which the novel VoIP communications system and method of the present invention interacts with IPv6. In diagram 10, router 11 and gateway 12 are standard hardware devices which are integrated with IPv6. Router 11 and gateway communicate to both the PSTN and the internet. Within IPv6, next headers generator 13, hop by hop options generator 14, current route generator 15 and router manager 16 are standard components.

The VoIP communications algorithm and related method of the present invention adds to IPv6 the following components and data packet processing steps: dynamic data library or DLL 17 (which includes destination database 18 and routing database 19), gross latency database 20, optimizations block 21, criterion block 22, quality of routes analyzer 23 and hop by hop switch 24 which is based on and works in correlation with DLL 17.

In operation, a data packet received through gateway 12 will trigger the trace program of IPv6, whereby all available routes through the "public" Internet will be identified, along with the time or latency associated with each route. The communications algorithm and related method of the present invention, as a next step, measures and identifies a subset of all available routes which represent the best available routes based upon latency and possible other factors, such as data packet volume. More specifically, gross latency database 20 and quality of routes analyzer 23 utilize preset criteria to measure and create a subset of best available routes for a given data packet transmission. These criteria are set by criterion block 22, are applied by gross latency database 20 and the results are measured and analyzed by quality of routes analyzer 23. The resulting "best available routes" subset is created a database within routing database 19. For example, criterion block can establish criteria for "best available routes" based upon latency measured at less than 100 ms. The criterion block also establishes the number of best available routes, e.g., 5, 10, 20, etc., which will be created as a database within routing database 19. To the extent data packet volume is also to be tested, criterion block 22 would be preset with relevant test factors in this respect as well.

Utilizing the same criteria, i.e., latency and other such data packet volume, the communications system and method of the present invention next identifies the best route, i.e., the route with the least latency, for the data package at that given period of time. In operations, this measurement is also made by the quality of routes analyzer and the resulting information is stored within routing database 19.

As a next step, the novel VoIP communication algorithm of the present invention selects the optimal route, with the least latency, at the precise transmission time of the data packet based on both current and historical information as the best route. In operation, this selection process involves optimizations block 21, destination database 17 and routing database 18. More specifically, destination database 17 and routing database 18 contain a routing table or historical information concerning the optimal transmission route for a data packet being directed to a specific destination at a specific time. For example, for a transmission between identified addresses in the United States and South America, destination database 17 and routing database 18 contain historical information showing the best route, i.e., the route with the least latency, at a given time within a day, week and year. It may be that the best route at a given instant is anomalous and that historical information within the routing table of destination database 17 and routing database 18 show one of the other routes within the subset of best available routes to be optimal. The route optimization step therefore may override the selection of the shortest available route at a given period of time. This optimal route selection is also based upon criteria set by criterion block 22. In operation, this optimal route is selected through the IPv6 components of the hop-by-hop options generator 14, current route generator 15 and router manager 16.

The communications algorithm of the present invention next continues to use the route management abilities within IPv6 to rerun the trace program at preset, periodic intervals and, through the steps described above, and identify subsequent (i) best available routes subsets, (ii) best routes at a given transmission time and (iii) optimal routes. Trace program intervals, e.g., every five seconds, are set by criterion block 22.

Utilizing optimizations block 21 and the hop-by-hop options generator 14 within IPv6, the VoIP communications algorithm and related method of the present invention at this point provides for the option of selecting an alternative best route and switching to same based upon both current and historical route data. In this context, switch 24 prevents hop-by-hop options generator 14 from switching to the best route, based solely on current route data, at each trace program interval and corresponding best route analysis. This switch is turned on by dynamic data library 17, and the hop-by-hop options generator is guided by routing database 18, when a new optimal route is identified. It is significant, in the present invention, that the dynamic data library 17 and optimizations block 21 bring historical routing table information into this route switching analysis. More specifically, it is not desirable to continue switching from best route to best route, based on instantaneous and periodic latency measurements along, as this can lead to distortions in voice quality. The communications method of the present invention functions to normalize latency delays, in an optimum range, over time so that latency is nominal and voice quality is maintained. In this context, the optimizations block 21 may override a best route, based on instantaneous, current trace measurements for, e.g., five trace intervals. At this point, historical table routing data may be over-ridden in favor of current latency measurements.

As a final step, the communications algorithm and related method of the present invention periodically updates the historic routing table information in dynamic data library 17 based upon measurements of the best available routes subsets and corresponding creations of datasets within routing database 19. Criterion block 22 sets these update intervals, and quality of routes analyzer acts to delete the accumulated best available routes datasets after this update process is complete. Thereafter, a new cycle of creating best available routes datasets begins anew. Accordingly, the communications system and method of the present invention has the ability to teach itself about changing route and latency conditions.

Figure 2:
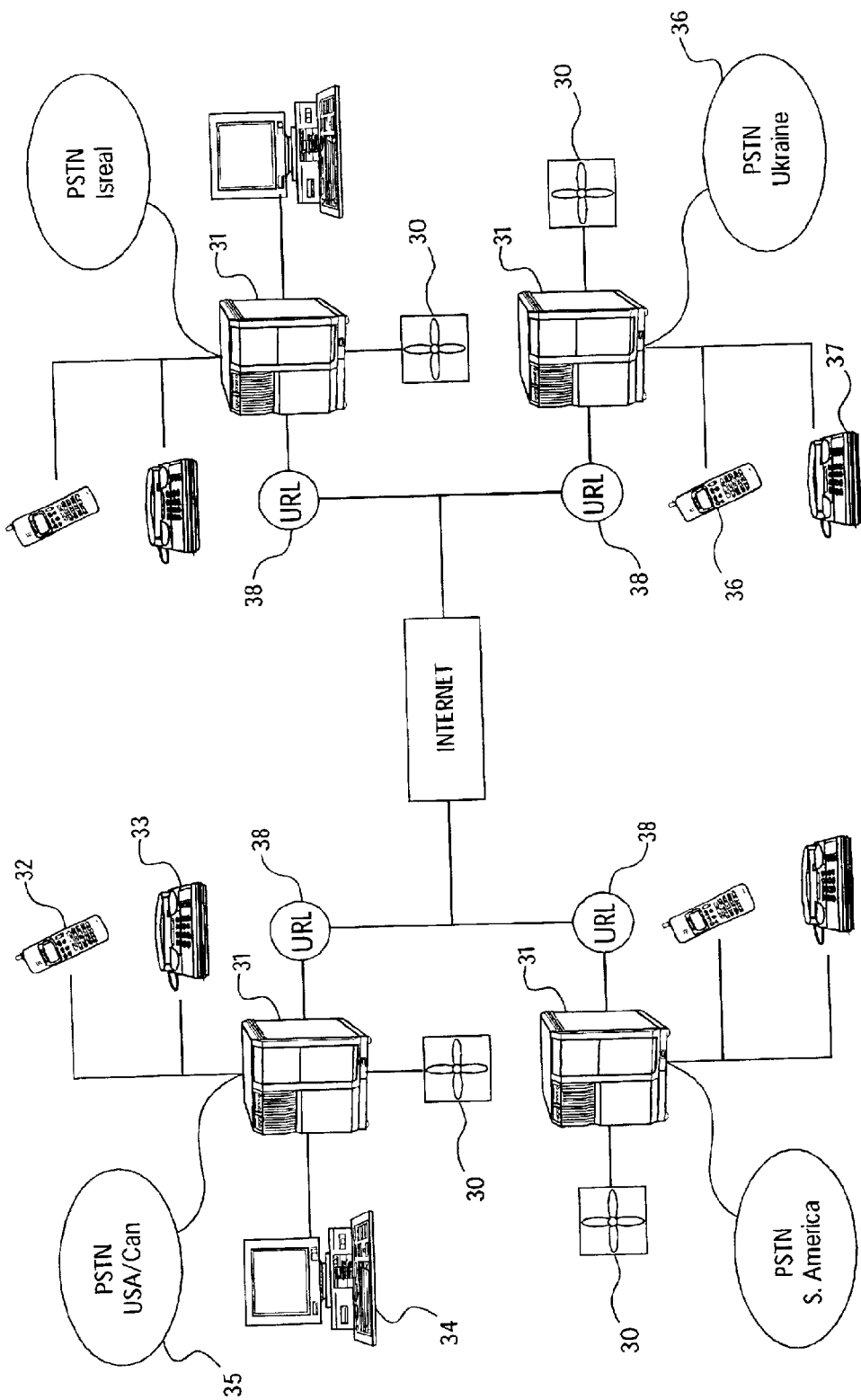
FIG. 2 is a block diagram of an internet system embodying the VoIP communications algorithm and related method of the present invention.

In operation, the present invention is functional only if it is installed in the gateways and POPs at both the transmitting and receiving ends of a voice transmission. Referring to FIG. 2, the VoIP communications algorithm of the present invention, depicted as latency optimizer 30, is installed at the gateway of each participant in the communications system. These gateways must be IPv6-integrated as well. Once installed, two-way VoIP communications, originating from either participant, are possible between enabled gateways and through routers 38. Importantly, each individual participant need not have his or her latency optimizer 30; rather, the gateway and related POP serve as a clearinghouse for multiple users. Thus, in FIG. 2, latency optimizer 30 associated with gateway 31 in the USA/Canada can support multiple communications from difference users, including users with a cell phone 32, and desk phone 33 or a personal computer 34. The related PSTN 35 in the USA/Canada can also be accessed. Again, provided the gateway 35 in, for example, the Ukraine is enabled with IPv6 and latency optimizer 30, users in the USA/Canada can communicate with the multiple users in the Ukraine who are utilizing similar devices, i.e., cell phone 36 or desk phone 37, and communicating through PSTN 39.

Described above has been an algorithm and related method for optimizing latency delays in VoIP and other multimedia communications over the "public" Internet. In this disclosure, there is shown and described only certain preferred embodiments of the invention, but, as aforementioned, it is to be understood that the invention is capable of use in various other combinations and environments and is capable of changes or modifications within the scope of the inventive concept as expressed herein.

What is claimed is:

1. In an Internet Protocol telephony system having at least two gateway devices integrated with Internet Protocol version 6 (IPv6), a voice over Internet Protocol (VoIP) communications method for optimizing latency delays in data packet transmissions between said gateway devices and over the related "public" Internet comprising the steps of:

a. identifying and conducting a trace of available VoIP routes between two user destinations, each associated with a separate gateway device and the related "public" Internet, and measuring the latency associated with all said available VoIP routes, said VoIP route identification and tracing process being conducted through a Latency header within the NEXT header extension of IPv6, which Latency header is a modification of the Source Routing header within the NEXT header extension of IPv6;

b. creating a subset of best available VoIP routes, based upon application of latency criteria, and, also using said latency criteria, identifying the best available VoIP route at the time of said trace measurement;

c. identifying and selecting an optimum VoIP route based upon consideration of both said best available VoIP route and historical information concerning the best available route between said two user destinations at past times;

d. conducting steps a, b and c at periodic intervals; and e. periodically updating historical information concerning best available routes between said two user destinations.

2. The VoIP communications method of claim 1, wherein steps a, b and c are conducted in correlation with a dynamic data library, which stores the VoIP route information created through steps a, b, c. and d and is associated with each said gateway device, said dynamic data library comprising:

a. a routing database which stores the information created by steps a, b and c, including said subset of best available VoIP routes; and b. a destination database which contains said historical information concerning best available VoIP routes between various user destinations.

3. The VoIP communications method of claim 2, wherein said routing database functions in correlation with and guides a hop-by-hop options generator within the Hop-to-Hop Options header of the NEXT header extension within IPv6.

4. The VoIP communications method of claim 2, wherein said dynamic data library and routing database further comprises a switch function which disengages and guides said hop-by-hop options generator from switching to each said best available VoIP route resulting from each said trace measurement until a new said optimum VoIP route is selected.

5. The VoIP communications method of claim 1, wherein step a further comprises the creation of gross latency database containing all said available VoIP routes between said two user destinations and the latency associated with each said route.

6. The VoIP communications method of claim 1, wherein step b is performed in correlation with a criterion block which establishes said latency criteria and establishes the number of routes included in said subset of best available VoIP routes.

7. The VoI communications method of claim 6, wherein step b further comprises the use of a quality of routes analyzer which, in conjunction with said criterion block, applies said latency criteria and assists in the creation of said subset of best available VoIP routes and in the identification of the best available VoIP route at the time of each said trace measurement.

8. The VoIP communications method of claim 2, wherein step c is performed in correlation with an optimizations block which compares said best available VoIP route identified for each said trace measurement with said historical information in said destination database concerning the best available VoIP routes between the same said two user destinations at same time, within a day, week and year, as each said trace measurement.

9. The VoIP communications method of claim 8, wherein said optimization block selects an optimum VoIP route which normalizes and reduces latency delays in an optimum range over the span of all said trace measurements conducted in connection with a data packet transmission.

10. The VoIP communications method of claim 6, wherein said criterion block further establishes said periodic intervals of trace measurements conducted in step d.

11. The VoIP communications method of claim 6, wherein said criterion block further establishes the periodic intervals at which said historical database is updated in step e.

12. The VoIP communications method of claim 2, wherein step e further comprises the deletion of the VoIP routes information created and contained in said routing database at periodic times.

13. The VoIP communications method of claim 12, wherein said periodic deletion of outing database information occurs at the same time as said update of said destination database.

14. The VoIP communications method of claim 1, wherein said communications method has application to multimedia transmissions over the "public" Internet.

15. A method of improving and optimizing latency delays associated with VoIP communications and related data packet transmissions between two user destinations and the associated "public" internet, which method comprises modifying the Source Routing header of the NEXT header extension within IPv6 to create a new Latency header, and, in conjunction with the Hop-to-Hop Options header of the NEXT header within IPv6, further comprises the steps of:
   a. identifying and conducting, through said Latency header, a trace of available VoIP routes between said two user destinations and measuring the latency associated with all said available VoIP routes;
   b. creating a subset of best available VoIP routes, based upon application of latency criteria, and, also using said latency criteria, identifying the best available VoIP route at the time of said trace measurement;
   c. identifying and selecting an optimum VoIP route based upon consideration of both said best available VoIP route and historical information concerning the best available route between said two user destinations at past times;
   d. conducting steps a, b and c at periodic intervals; and
   e. periodically updating historical information concerning best available routes between said two user destinations.

16. The VoIP communications method of claim 15 wherein steps a, b, c and d are conducted in correlation with a dynamic data library, which stores the VoIP route information created through said steps, and comprises:
   a. a routing database which stores the VoIP route information created by steps a, b and c and including said subset of best available VoIP routes; and
   b. a destination database which contains said historical information concerning best available VoIP routes between various user destinations.

17. The VoIP communication method of claim 16 wherein said optimum VoIP route selection occurs in connection with said routing database which functions in correlation with or guides a hop-by-hop option generation within said Hop-by-Hop Options header.

18. The VoIP communications method of claim 17, wherein said dynamic data library and said routing database further comprise a switch function which disengage and guide said hop-by-hop options generator from switching to each said best available VoIP route resulting from each said trace measurement until a new said optimum VoIP route is selected.

19. The VoIP communications method of claim 15, wherein step a further comprises the creation of gross latency database containing all said available VoIP routes between said two user destinations and the latency associated with each said route.

20. The VoIP communications method of claim 15, wherein step b is performed in correlation with a criterion block which establishes said latency criteria and establishes the number of routes included in said subset of best available VoIP routes.

21. The VoIP communications method of claim 20, wherein step b further comprises the use of a quality of routes analyzer which, in conjunction with said criterion block, applies said latency criteria and assists in the creation of said subset of best available VoIP routes and in the identification of the best available VoIP route at the time of each said trace measurement.

22. The VoIP communications method of claim 15, wherein step c is performed in correlation with an optimizations block which compares said best available VoIP route identified for each said trace measurement with said historical information in said destination database concerning the best available VoIP routes between the same said two user destinations at same time, within a day, week and year, as each said trace measurement.

23. The VoIP communications method of claim 22, wherein said optimization block selects an optimum VoIP route which normalizes and reduces latency delays in an optimum range over the span of all said trace measurements conducted in connection with a data packet transmission.

24. The VoIP communications method of claim 20, wherein said criterion block further establishes said periodic intervals of trace measurements conducted in step d.

25. The VoIP communications method of claim 20, wherein said criterion block further establishes the periodic intervals at which said historical database is updated in step e.

26. The VoIP communications method of claim 15, wherein step e further comprises the deletion of the VoIP routes information created and contained in said routing database at periodic times.

27. The VoIP communications method of claim 26, wherein said periodic deletion of routing database information occurs at the same time as said update of said destination database.

28. The VoIP communications method of claim 15, wherein said communications method has application to multimedia transmissions over the "public" Internet.

* * * * *